(12) United States Patent
Tsirkin et al.

(10) Patent No.: US 10,481,951 B2
(45) Date of Patent: Nov. 19, 2019

(54) MULTI-QUEUE DEVICE ASSIGNMENT FOR APPLICATION GROUPS

(71) Applicant: Red Hat Israel, Ltd., Ra'anana (IL)

(72) Inventors: Michael Tsirkin, Westford, MA (US); Marcel Apfelbaum, Ra'anana (IL)

(73) Assignee: Red Hat Israel, Ltd., Ra'anana (IL)

( * ) Notice: Subject to any disclaimer, the term of this patent is extended or adjusted under 35 U.S.C. 154(b) by 122 days.

(21) Appl. No.: 15/351,971

(22) Filed: Nov. 15, 2016

(65) Prior Publication Data

US 2018/0136977 A1 May 17, 2018

(51) Int. Cl.
| | |
|---|---|
| *G06F 9/50* | (2006.01) |
| *G06F 12/06* | (2006.01) |
| *G06F 13/16* | (2006.01) |
| *G06F 9/48* | (2006.01) |
| *G06F 12/1081* | (2016.01) |
| *G06F 12/109* | (2016.01) |

(52) U.S. Cl.
CPC .......... *G06F 9/5016* (2013.01); *G06F 9/4881* (2013.01); *G06F 12/0646* (2013.01); *G06F 12/0653* (2013.01); *G06F 12/109* (2013.01); *G06F 12/1081* (2013.01); *G06F 13/1673* (2013.01); *G06F 2212/1008* (2013.01); *G06F 2212/1024* (2013.01); *G06F 2212/1041* (2013.01); *G06F 2212/152* (2013.01); *G06F 2212/657* (2013.01)

(58) Field of Classification Search
CPC .. G06F 9/5016; G06F 9/4881; G06F 12/0646; G06F 13/1673; G06F 2212/1041
See application file for complete search history.

(56) References Cited

U.S. PATENT DOCUMENTS

| | | | |
|---|---|---|---|
| 6,032,179 A | 2/2000 | Osborne | |
| 6,044,418 A * | 3/2000 | Muller | H04L 49/90 710/39 |
| 6,314,501 B1 * | 11/2001 | Gulick | G06F 9/54 711/153 |
| 7,826,470 B1 | 11/2010 | Aloni et al. | |
| 7,908,457 B2 * | 3/2011 | Arndt | G06F 12/0646 711/209 |
| 8,589,941 B2 * | 11/2013 | Cardona | G06F 9/505 718/105 |
| 9,077,659 B2 | 7/2015 | Armstrong et al. | |
| 2008/0195581 A1 * | 8/2008 | Ashmore | G06F 3/0607 |

(Continued)

*Primary Examiner* — Francisco A Grullon

(74) *Attorney, Agent, or Firm* — K&L Gates LLP

(57) ABSTRACT

A system and method of device assignment includes receiving, by a supervisor, an assignment request to assign a device to a first application and a second application. The first application is associated with a first memory and has a first address. The second application is associated with a second memory and has a second address. The supervisor selects a first bus address offset and a second bus address offset, which is different from the first bus address offset. The supervisor sends, to the first application, the first bus address offset. The supervisor sends, to the second application, the second bus address offset. The supervisor updates a mapping to the first address to include the first bus address offset and updates a mapping to the second address to include the second bus address offset. The device is assigned to the first application and the second application.

20 Claims, 6 Drawing Sheets

(56) References Cited

U.S. PATENT DOCUMENTS

| | | | | |
|---|---|---|---|---|
| 2009/0006801 A1* | 1/2009 | Shultz | ............... | G06F 9/5016 |
| | | | | 711/170 |
| 2015/0334177 A1* | 11/2015 | Szalay | ............... | G06F 9/44 |
| | | | | 709/201 |
| 2015/0347179 A1* | 12/2015 | Barraclough | ......... | G06F 9/4818 |
| | | | | 718/103 |

* cited by examiner

MULTI-QUEUE DEVICE ASSIGNMENT FOR APPLICATION GROUPS

BACKGROUND

The present disclosure relates generally to memory management of applications and, more particularly, to multi-queue device assignment to application groups. Multiple applications may, for example, run concurrently and separate from other applications, on one or more computer systems. Running multiple applications may be achieved by running a supervisor above the hardware and below the applications. A supervisor may control the physical layer and provide interfaces between the underlying hardware and the applications. Processor designation may be implemented by the supervisor scheduling time slots on one or more physical processors for an application, rather than the application actually having a dedicated physical processor.

SUMMARY

The present disclosure provides new and innovative methods and systems for device assignment. For example, an example method includes receiving, by a supervisor, an assignment request. The assignment request is a request to assign a device to at least a first application and a second application. The first application is associated with a first memory, the first memory being a portion of a physical memory and having a first address. The second application is associated with a second memory, the second memory being a portion of the physical memory different from the first memory and having a second address. The method includes selecting, by the supervisor, a first bus address offset and a second bus address offset, which is different from the first bus address offset. The supervisor sends, to the first application, the first bus address offset. Also, the supervisor sends, to the second application, the second bus address offset. The method includes updating, by the supervisor, an input-output memory management unit, including updating a mapping to the first address to include the first bus address offset, and updating a mapping to the second address to include the second bus address offset. The device is assigned to the first application and the second application.

Additional features and advantages of the disclosed methods and system are described in, and will be apparent from, the following Detailed Description and the Figures.

DETAILED DESCRIPTION OF EXAMPLE EMBODIMENTS

In computer systems simultaneously executing multiple applications, each of the applications may or may not have dedicated hardware. For example, some of the applications may share hardware for specific functions (e.g., as application groups). Though hardware may be shared by applications for specific functions, a single device function may only be assigned to a single application. To manage device functions, shared devices (e.g., NIC cards, disks, etc.) have multiple hardware queues. Multiple hardware queues may be implemented, for example, including a transmission hardware queue and a receiving hardware queue. These queues may be configured to specify rules on how packets should be handled (e.g., which packets go on which queues). In this way, individual usage of hardware, by a number of different applications, may be scheduled and prioritized.

Additionally, in a typical multi-application system, it may be common for a group of applications to trust one another. By establishing mutual trust among the applications, applications can be dedicated to implement specific networking functions (e.g., one application may be dedicated to a first process, associated with a first device, whereas a second application may be dedicated to a second process, associated with a second device). Thus, the applications are not competing for access to the same hardware device (e.g., multi-queue access is effectively implemented), and access competition is eliminated.

However, establishing mutual trust among the applications does not fix problems associated with device access and hardware queue inefficiencies. The present disclosure describes systems and methods enabling multiple applications, which do not require memory protection from each other, to share a single hardware function (e.g., with polling mode drivers, NIC cards, etc.) through implementation of bus address offsets assigned to individual applications. By assigning a respective bus address offset to each individual application, for example, each application can, in essence, see the whole device but only access its own queue using a range of addresses associated with its bus address offset, without interfering with other applications. Advantageously, no communication or queuing may be necessary between or among the multiple applications. Thus, multiple applications can exist, and take actions with respect to hardware devices, both simultaneously and in parallel. By allowing more applications to use assigned devices, existing hardware is more effectively utilized in multi-application systems.

Figure 1:
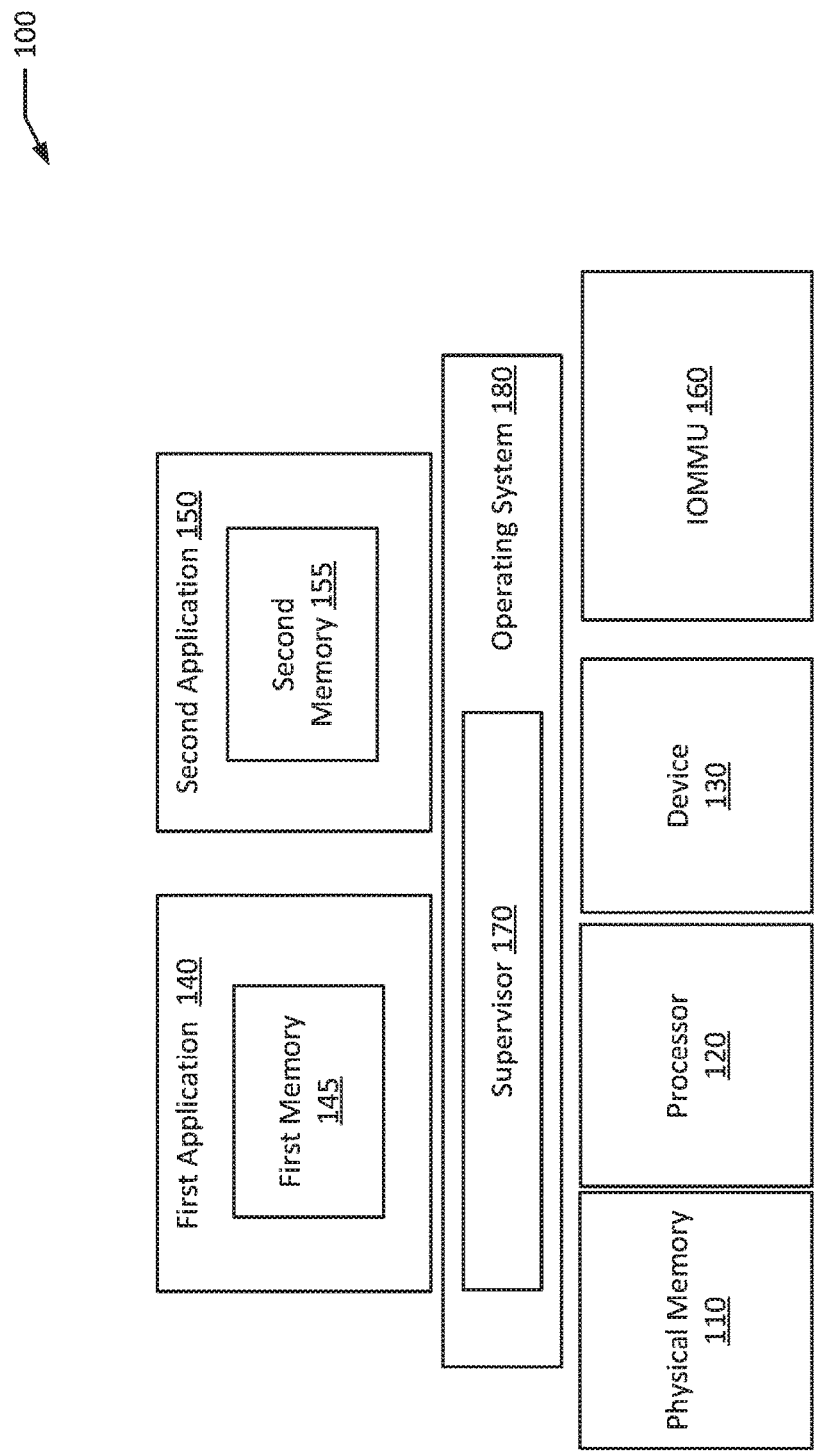
FIG. 1 is a block diagram of an example computer system according to an example of the present disclosure.

FIG. 1 is a block diagram of an example computer system 100 according to an example of the present disclosure. The computer system 100 may include one or more memory devices (e.g., physical memory 110) communicatively coupled to one or more physical processors (e.g., processor 120). Likewise, computer system 100 may include one or more devices (e.g., device 130). In an example, device 130 may be an input/output device. In an example, device 130 may be a hardware device, which may include a network device (e.g., a network interface controller (NIC), a network adapter, or any other component that connects a computer to a computer network), a peripheral component interconnect (PCI) device, storage devices, sound or video adaptors, photo/video cameras, printer devices, keyboards, displays, etc.

As used herein, physical processor or processor 120 refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In an example, a processor may be a single core processor which is typically capable of executing one instruction at a time (or process a single pipeline of instructions), or a multi-core processor which may simultaneously execute multiple instructions. In another example, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, physical memory 110 refers to a volatile or non-volatile memory device, such as RAM, ROM, EEPROM, or any other device capable of storing data. As discussed herein, device 130 may refer to a device capable of providing an interface between one or more processors (e.g., processor 120) and an external device. The external device's operation is based on the processor inputting and/or outputting data.

Processor 120 may be interconnected (to additional processors) using a variety of techniques, ranging from a point-to-point processor interconnect, to a system area network, such as an Ethernet-based network. Local connections, including the connections between processor 120 and physical memory 110, and between processor 120 and device 130, may be provided by one or more local buses of suitable architecture, for example, peripheral component interconnect (PCI).

The computer system 100 may include one or more applications. For example, computer system 100 includes first application 140 and second application 150. Each application may additionally include a memory. For example, first application 140 includes first memory 145. Likewise, for example, second application 150 includes second memory 155. Though memory may be associated with individual applications (e.g., first memory 145 with first application 140), the memory physically exists on computer system 100 as physical memory 110. For example, first memory 145 is a portion of memory on physical memory 110. Likewise, for example, second memory 155 is a different portion of memory on physical memory 110.

The computer system 100 may include a supervisor 170. In an example, supervisor 170 is a kernel. As noted above, computer system 100 may run multiple applications (e.g., first application 140, second application 150, etc.). This may include executing the supervisor 170 above the hardware and below the applications, as schematically shown in FIG. 1. In an example, the supervisor 170 may be a component of a operating system 180 (OS) executed by the computer system 100. The supervisor 170 may manage the physical layer (e.g., physical memory 110, processor 120, device 130, etc.) and present this physical layer to applications (e.g., first application 140, second application 150, etc.).

The supervisor 170 controls and limits access to memory allocated to applications (e.g., first memory 145, second memory 155, etc.). For example, physical memory 110 may be divided into a number of portions of memory (e.g., first memory 145, second memory 155, etc.). Access to these individual portions of memory are controlled and limited by supervisor 170. Likewise, for example, memory allocated to individual applications (e.g., first memory 145 allocated to first application 140) is mapped from physical memory 110, such that when an application (e.g., first application 140) or a device (e.g., device 130) uses or access a memory page (e.g., a page from first memory 145), it is actually using or accessing physical memory 110.

The computer system 100 may include an input-output memory management unit (IOMMU) 160. The supervisor 170 may keep track of how each memory page is mapped, allocated, accessed, and/or used through the use of the IOMMU 160. The IOMMU 160 maps the device address space (e.g., a bus address) that is relevant to the I/O bus into the physical address space (e.g., a physical address). The device address space may be a physical address space (e.g., the physical address), which is mapped by the IOMMU 160 into a different address space (e.g., the first result). In an example, the IOMMU 160 may support two-layer translation and thus translate the bus address to the first result (e.g., bus address to physical address to first result). The IOMMU 160 may also include extra information associated with the mapping, such as read and write permissions. For example, mappings in the IOMMU 160 allow a device (e.g., device 130) to access a particular address (e.g., a physical address). Likewise, for example, mappings can be removed to prevent direct access, by the device 130, to the particular address. The mechanism of mapping and unmapping an address allows the supervisor 170 to control access to a particular address in memory (e.g., physical memory 110, first memory 145, second memory 155, etc.). As a result, the supervisor 170 can maintain memory integrity by preventing device 130 from performing illegal transactions or accessing invalid addresses. Additionally, when applications are grouped (e.g., into security groups) device access may be controlled on a group-to-group basis.

In this manner, the supervisor 170, through the IOMMU 160, can prevent memory allocated to one application (e.g., first application 140) from being inappropriately accessed and/or modified by another application (e.g., second application 150). Additionally, the supervisor 170, through the IOMMU 160, can prevent memory accessible by one device (e.g., device 130) from being used by another device. In an example, the IOMMU 160 is a separate component from the applications (e.g., first application 140, second application 150, etc.), the operating system 180, and the supervisor 170. In a different example, the IOMMU 160 is emulated, such that it is included within the operating system 180 and/or processor 120, and used by the applications (e.g., first application 140, second application 150, etc.) to communicate with the supervisor 170.

Mappings to memory, stored in the IOMMU 160, are accessible by the supervisor 170, the first application 140, the second application 150, etc. Through these mappings, the memory itself can be accessed. Likewise, mappings may be used together with any paging data structure used by the applications (e.g., first application 140, second application 150, etc.) to support translation from the device address space (e.g., the bus address) to the physical address space (e.g., the physical address) and into different physical address spaces (e.g., the first result). Translation may be performed, for example, by utilizing 32-bit linear address space using a two-level hierarchical paging structure, Physical Address Extension mode, INTEL® Extended Memory 64 Technology mode, etc.

Figure 2:
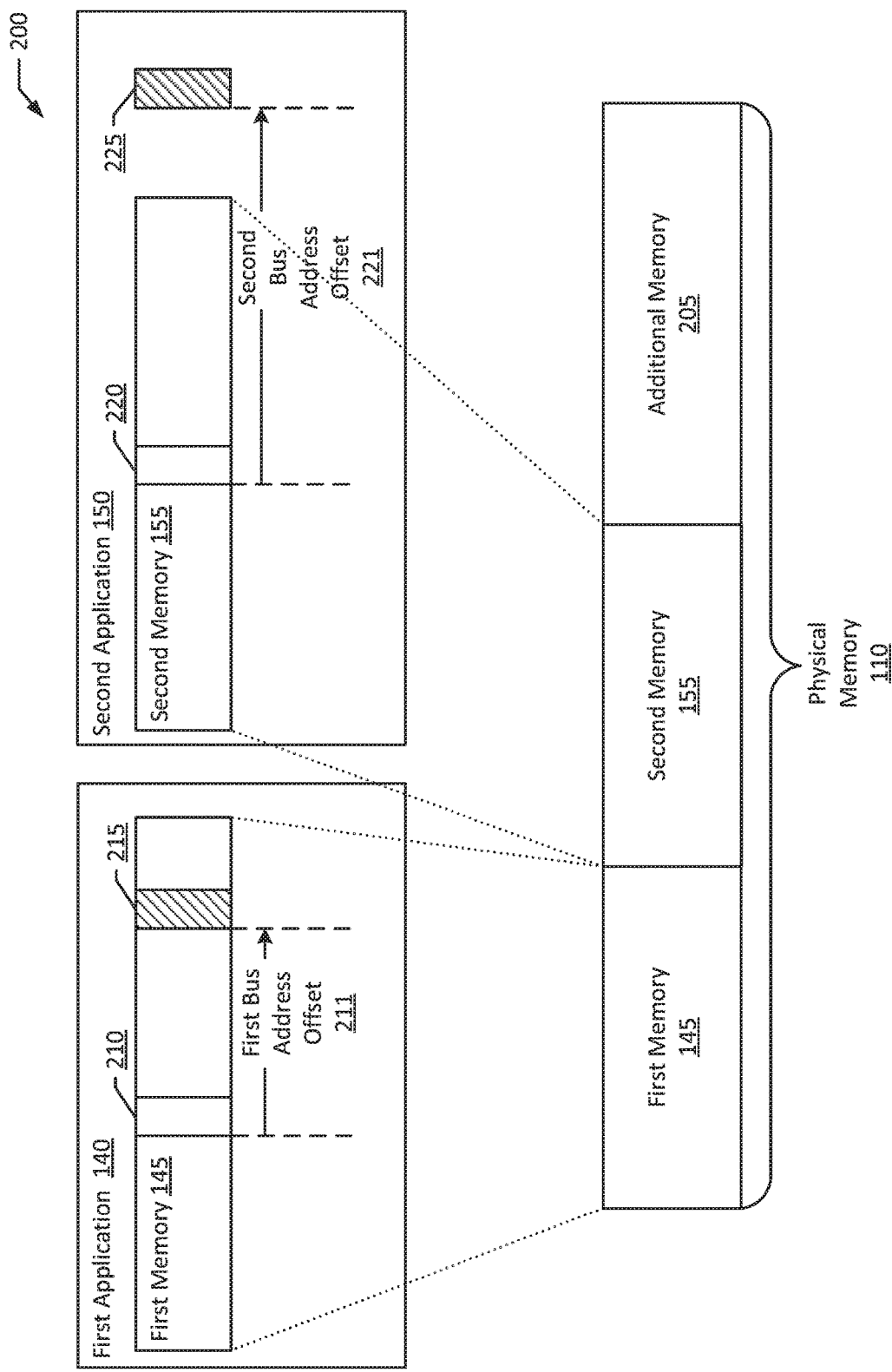
FIG. 2 is a block diagram illustrating memory related to bus address offsets according to an example of the present disclosure.

FIG. 2 is a block diagram illustrating memory related to bus address offsets according to an example of the present disclosure. The memory diagram 200 illustrated by FIG. 2 is a detailed diagram of some of the memory components previously discussed as components of computer system 100. For example, memory diagram 200 includes a first application 140 and a second application 150. The first application 140 includes first memory 145 and the second application 150 includes second memory 155. Likewise, memory diagram 200 includes physical memory 110.

As previously mentioned, for example, though memory may be associated with individual applications (e.g., first memory 145 with first application 140), the memory physically exists as a portion of memory on physical memory 110.

For example, first memory 145 is a portion of memory on physical memory 110. First memory 145 includes a first address 210 (e.g., an address in first memory 145). Likewise, for example, second memory 155 is a different portion of memory on physical memory 110. Second memory 155 includes a second address 220 (e.g., an address in second memory 155). Likewise, for example, additional memory 205 is another different portion of memory on physical memory 110. For example, the additional memory 205 may be re-allocated to the first memory 145, the second memory 155, etc. Likewise, for example, the additional memory 205 may be allocated to other components or systems (e.g., operating system 180, memory associated with another application, etc.).

Each of the first application 140 and the second application 150 are sent a respective bus address offset. For example, the first application 140 is sent a first bus address offset 211. Likewise, for example, the second application 150 is sent a second bus address offset 221. Each of the first bus address offset 211 and the second bus address offset 221 are used to determine results. For example, the first bus address offset 211 is used, with the first address 210, to determine a first result 215. Likewise, for example, the second bus address offset 221 is used, with the second address 220, to determine a second result 225. In an example, the first bus address offset 211 and the second bus address offset 221 are numerical multiples of one another. For example, the first bus address offset 211 is a 2 GB offset and the second bus address offset 221 is a 4 GB offset, the first bus address offset 211 is a 3 GB offset and the second bus address offset 221 is a 9 GB offset, the first bus address offset 211 is a 2 GB offset and the second bus address offset 221 is a 10 GB offset, etc.

In an example the first result 215 and the second result 225 are physical-offset addresses. For example, physical memory 110 has a fixed physical range (e.g., physical locations 0 GB to 100 GB). The first memory 145 is associated with a portion of physical memory 110 (e.g., from physical locations 0 GB to 2 GB in physical memory 110). For example, locations 0 GB to 2 GB in first memory 145 are associated with physical locations 0 GB to 2 GB in physical memory 110. In this sense, an address associated with the first application 140 (e.g., first address 210) is within the first memory 145, and the related physical memory 110. Using the first bus address offset 211 (e.g., a 3 GB offset), the first address 210 becomes a first result 215. For example, first address 210 is at the 1 GB location in first memory 145 (e.g., the 1 GB physical location in physical memory 110). Using the first bus address offset 211 (e.g., the 3 GB offset) the first address 210 becomes the first result 215 at the 4 GB location in first memory 145. While the first result 215 is at the 4 GB location in first memory 145, the related physical memory 110 location is still the 1 GB location.

Likewise, for example, the second memory 155 is associated with a different portion of physical memory 110 (e.g., from physical locations 2 GB to 4 GB in physical memory 110). For example, locations 0 GB to 2 GB in second memory 155 are associated with physical locations 2 GB to 4 GB in physical memory 110. In this sense, an address associated with the second application 150 (e.g., second address 220) is within the second memory 155, and the related physical memory 110. Using the second bus address offset 221 (e.g., a 6 GB offset), the second address 220 becomes a second result 225. For example, second address 220 is at the 1 GB location in second memory 155 (e.g., the 3 GB physical location in physical memory 110). Using the second bus address offset 221 (e.g., the 6 GB offset) the second address 220 becomes the second result 225 at the 7 GB location in second memory 155. While the second result 225 is at the 7 GB location in second memory 155, the related physical memory 110 location is still the 3 GB location.

In different example, results can be other types of addresses (e.g., physical addresses, offset addresses, etc.) and other types of location information (e.g., physical address ranges, offset address ranges, etc.). To see how these results are used, by the supervisor 170, the IOMMU 160, first application 140, second application 150, and device 130, a flow diagram is useful.

Figure 3:
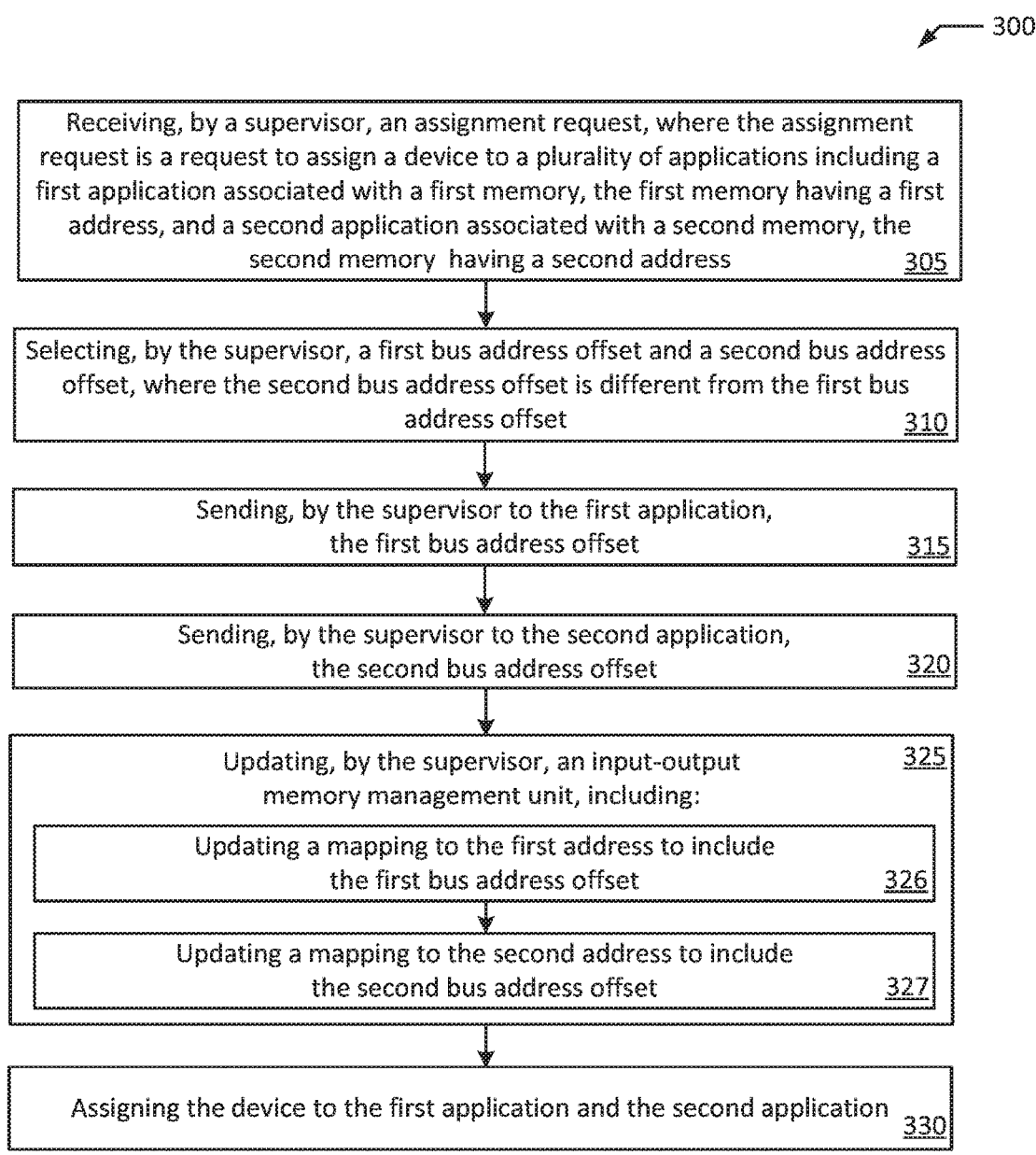
FIG. 3 is a flowchart illustrating an example method of device assignment according to an example of the present disclosure.

FIG. 3 is a flowchart illustrating an example method of device assignment according to an example of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, and some of the blocks described are optional. The method 300 may be performed by processing logic that may include hardware (circuitry, dedicated logic, etc.), software, or a combination of both. In an example, the method is performed by a supervisor 170 interacting with a device 130, a first application 140, a second application 150, and an IOMMU 160. In other examples, the method 300 is performed by other memory systems (e.g., computer system 100, an external computer system, etc.)

The example method 300 starts with receiving, by a supervisor, an assignment request, where the assignment request is a request to assign a device to a plurality of applications including a first application associated with a first memory, the first memory having a first address, and a second application associated with a second memory, the second memory having a second address (block 305). For example, supervisor 170 receives the assignment request. In an example, the assignment request is a request to assign a device (e.g., device 130) to a plurality of applications including the first application 140 and the second application 150. The first application 140 is associated with first memory 145, the first memory 145 having first address 210. The second application 150 is associated with second memory 155, the second memory 155 having second address 220. In an example, each of the first address 210 and the second address 220 physically exist in physical memory 110. For example, physical memory 110 includes first memory 145, second memory 145, and additional memory 205 (as described above with reference to FIG. 2).

The supervisor selects a first bus address offset and a second bus address offset, where the second bus address offset is different from the first bus address offset (block 310). For example, supervisor 170 selects first bus address offset 211 and second bus address offset 221. The second bus address offset 221 is different (e.g., a different size offset) from the first bus address offset 211. In an example, the second bus address offset 221 is a numerical multiple of the first bus address offset 211. For example, the first bus address offset 211 is a 3 GB offset and the second bus address offset 221 is a 6 GB offset (e.g., the second bus address offset 221 is two-times the first bus address offset 211).

The supervisor sends, to the first application, the first bus address offset (block 315). For example, supervisor 170 sends the first bus address offset 211 (e.g., the 3 GB offset) to the first application 140. The supervisor also sends, to the second application, the second bus address offset (block 320). For example, supervisor 170 sends the second bus address offset 221 (e.g., the 6 GB offset) to the second application 150.

The supervisor updates an input-output memory management unit (block 325). For example, supervisor 170 updates IOMMU 160. Updating the input-output memory management unit includes updating a mapping to the first address to include the first bus address offset (block 326). For example, supervisor 170 updates the mapping to first address 210 to include the first bus address offset 211 (e.g., the 3 GB offset). Updating the input-output memory management unit includes updating a mapping to the second address to include the second bus address offset (block 327). For example, supervisor 170 updates the mapping to the second address 220 to include the second bus address offset 221 (e.g., the 6 GB offset).

The example method 300 further includes assigning the device to the first application and the second application (block 330). For example, supervisor 170 assigns device 130 to the first application 140. Likewise, for example, supervisor 170 assigns device 130 to the second application 150. In an alternate example, responsive to the supervisor 170 updating the mapping to the first address 210 and the second address 220, each of the first application 140 and the second application 150 are automatically assigned to device 130. For example, once mappings are updated, the device 130 has access to the respective applications.

Figure 4A:
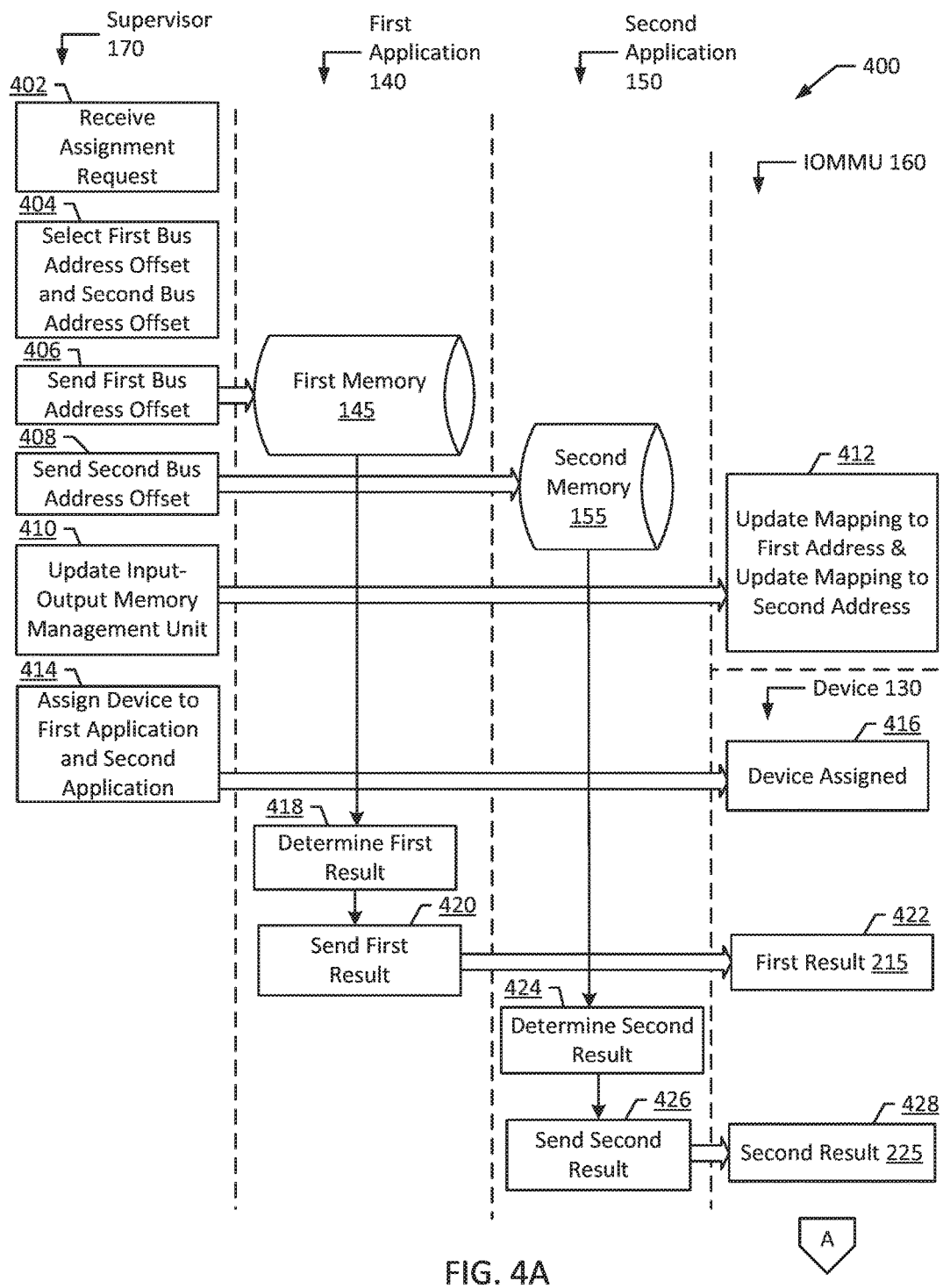
FIGS. 4A-B are flow diagrams illustrating device assignment with bus address offsets according to an example of the present disclosure.
Figure 4B:
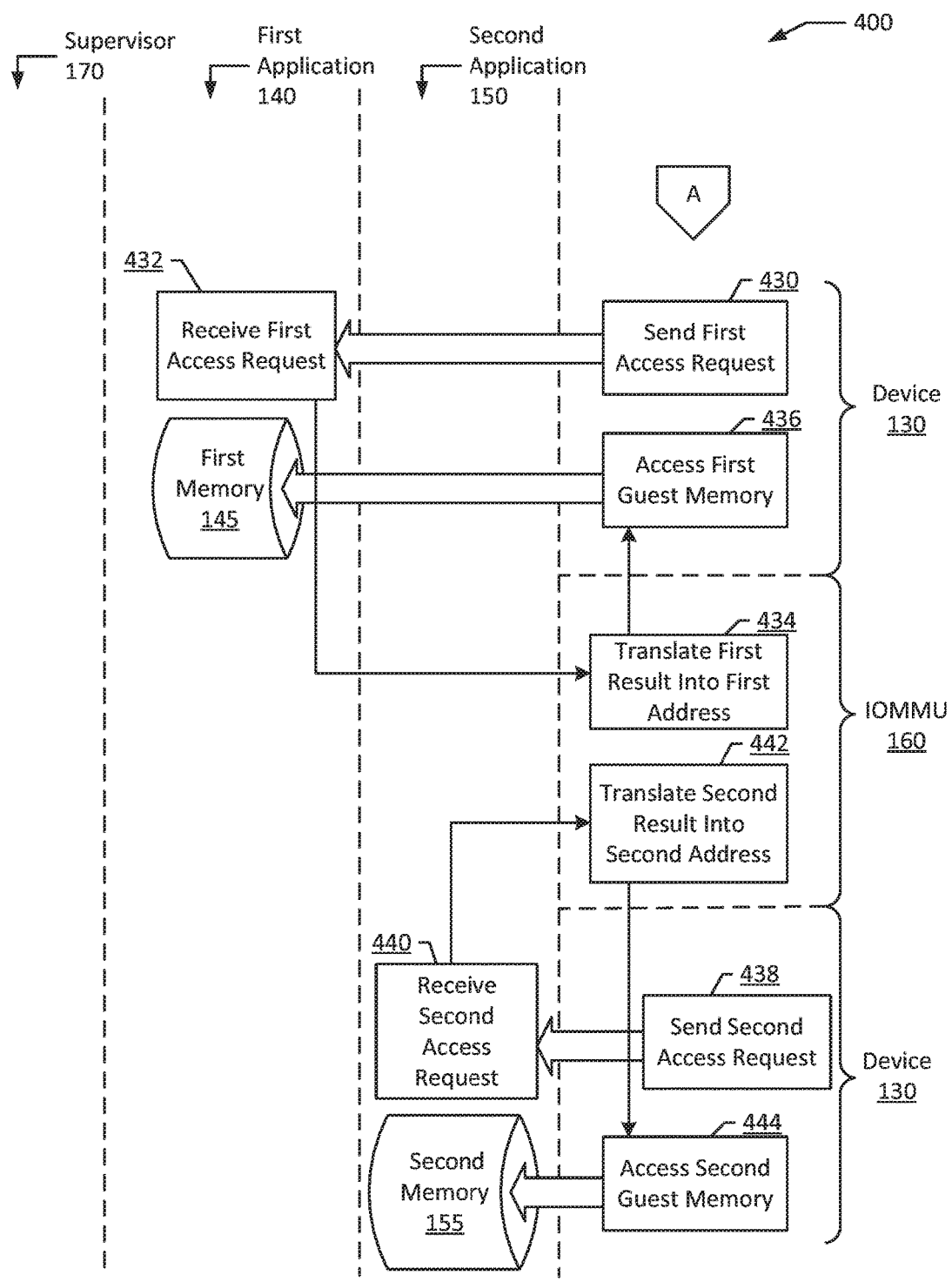

FIGS. 4A-B are flow diagrams illustrating device assignment with bus address offsets according to an example of the present disclosure. Although the example method 400 is described with reference to the flow diagram illustrated in FIGS. 4A-B, it will be appreciated that many other methods of performing the acts associated with the method may be used. For example, the order of some of the blocks may be changed, certain blocks may be combined with other blocks, and some of the blocks described are optional. The method 400 may be performed by processing logic that may include hardware (circuitry, dedicated logic, etc.), software, or a combination of both. In an example, the method 400 is performed by a supervisor 170 interacting with a device 130, a first application 140, a second application 150, and an IOMMU 160. In other examples, the method 400 is performed by other memory systems (e.g., computer system 100, an external computer system, etc.).

In the illustrated example in FIG. 4A, a supervisor 170 receives an assignment request (block 402). In an example, the supervisor 170 is included in an operating system (e.g., operating system 180). For example, the supervisor 170 may be a kernel. In an example, the assignment request is sent from an administrator. In a different example, the assignment request is sent from an external device (e.g., device 130). In another different example, each of the first application 140 and the second application 150 are on an assignment list. In this example, the assignment list dictates specifics regarding the assignment request received by the supervisor 170.

The assignment request is a request to assign a device (e.g., device 130) to a plurality of applications including at least a first application 140 and a second application 150. In an example, the first application 140 and the second application 150 are in a security group. Each of the first application 140 and the second application 150 has memory that is associated with physical memory 110 (e.g., a 100 GB range of physical memory). For example, the first application 140 has a first memory 145 (e.g., a 2 GB range, analogous to locations 0 GB to 2 GB in first memory 145) associated with a portion of physical memory 110 (e.g., physical memory 110 from physical locations 0 GB to 2 GB). This first memory 145 has a first address 210 (e.g., a first physical address at physical location 1 GB in the physical memory 110, which is analogous to memory location 1 GB in first memory 145).

Likewise, for example, the second application 150 has a second memory 155 (e.g., a 2 GB range, analogous to locations 0 GB to 2 GB in second memory 155) associated with a portion of physical memory 110 (e.g., physical memory 110 from physical locations 2 GB to 4 GB) different from the first memory 145. This second memory 155 has a second address 220 (e.g., a second physical address at physical location 3 GB in the physical memory 110, which is analogous to memory location 1 GB in second memory 155).

To recap, in this example, the first address is at physical location 1 GB in the physical memory 110, analogous to memory location 1 GB in first memory 145; the second address is at physical location 3 GB in the physical memory 110, analogous to memory location 1 GB in first memory 155.

The supervisor 170 selects a first bus address offset 211 and a second bus address offset 221 (block 404). For example, the first bus address offset 211 is a 3 GB offset and the second bus address offset 221 is a 6 GB offset. In an example, the second bus address offset 221 is different from the first bus address offset 211 (e.g., a numerical multiple). In a different example, the second bus address offset 221 is the same as the first bus address offset 211. The supervisor 170 sends the first bus address offset 211 to the first application 140 (block 406). In an example, the first bus address offset 211 (e.g., the 3 GB offset) is sent to the first memory 145 of the first application 140. For example, the 3 GB offset is sent to first memory 145, which is associated with physical memory 110 from physical locations 0 GB to 2 GB. Likewise, the supervisor 170 sends the second bus address offset 221 to the second application 150 (block 408). In an example, the second bus address offset 221 (e.g., the 6 GB offset) is sent to the second memory 155 of the second application 150. For example, the 6 GB offset is sent to second memory 155, which is associated with physical memory 110 from physical locations 2 GB to 4 GB.

The supervisor 170 updates an IOMMU 160 (block 410). More particularly, updating the IOMMU 160 involves updating a mapping to the first address 210 and updating a mapping to the second address 220 (block 412). This includes updating the mapping to the first address 210 (e.g., physical location 1 GB in physical memory 110) to include the first bus address offset 211 (e.g., 3 GB offset). Likewise, updating the IOMMU 160 involves updating a mapping to the second address 220 (e.g., physical location 3 GB in physical memory 110) to include the second bus address offset 221 (e.g., the 6 GB offset). In an example, by updating the mapping to the first address 210 to include the first bus address offset 211 and by updating the mapping to the second address 220 to include the second bus address offset 221, the supervisor 170 configures the IOMMU 160 to limit the device 130 to accessing the first memory 145 and the second memory 155. For example, additional memory 205 is protected from the device 130.

The supervisor 170 assigns the device 130 to the first application 140 and the second application 150 (blocks 414 and 416). In an alternate example, responsive to the supervisor 170 updating the mapping to the first address 210 and the second address 220, each of the first application 140 and the second application 150 are automatically assigned to device 130. For example, once mappings are updated, the device 130 has access to the respective applications. By assigning the device 130 to each of the first application 140 and the second application 150, each of the first application 140 and the second application 150 may utilize the device 130 as a hardware device (e.g., for computer processing, for performing actions, etc.) as dictated by the individual applications.

The first application 140 determines a first result 215 (block 418). Determining the first result 215 involves using both the first bus address offset 211 (e.g., the 3 GB offset) and a first address 210 in the first memory 145. The first address 210 is the first application 140 memory-equivalent to the first physical address location in physical memory 110. For example, physical location 1 GB in the physical memory 110 is within the 2 GB physical range (e.g., physical locations 0 GB to 2 GB) for first memory 145. Associating this 2 GB physical range with the first application 140 (e.g., locations 0 GB to 2 GB) for first memory 145, the first address 210 is at location 1 GB in first memory 145 (e.g., analogous to location 1 GB in physical memory 110). Including the first bus address offset 211 (e.g., 3 GB offset), the first result 215 is determined. For example, adding the first bus address offset 211 (e.g., 3 GB offset) to the first address 210 (e.g., at location 1 GB in first memory 145) yields first result 215 at location 4 GB in first memory 145. The first application 140 sends the first result 215 to device 130 (blocks 420 and 422). For example, the first result 215 is associated with location 4 GB in first memory 145.

Likewise, the second application 150 determines a second result 225 (block 424). Determining the second result 225 involves using both the second bus address offset 221 (e.g., the 6 GB offset) and a second address 220 in the second memory 155. The second address 220 is the second application 150 memory-equivalent to the second physical address location in physical memory 110. For example, physical location 3 GB in the physical memory 110 is within the 2 GB physical range (e.g., physical locations 2 GB to 4 GB) for second memory 155. Associating this 2 GB physical range with the second application 150 (e.g., locations 0 GB to 2 GB) for second memory 155, the second address 220 is at location 1 GB in second memory 155 (e.g., analogous to location 3 GB in physical memory 110). Including the second bus address offset 221 (e.g., 6 GB offset), the second result 225 is determined. For example, adding the second bus address offset 221 (e.g., 6 GB offset) to the second address 220 (e.g., at location 1 GB in second memory 155) yields second result 225 at location 7 GB in second memory 155. The second application 150 sends the second result 225 to device 130 (blocks 426 and 428). For example, the second result 225 is associated with location 7 GB in second memory 155.

To recap, in the example above, each of the first address 210 and the second address 220 are at location 1 GB in the respective first memory 145 and second memory 155, because each of the first memory 145 and the second memory 155 has a 2 GB range. If the first application 140 and the second application 150 pass these addresses to the device 130, the device 130 would perceive both of the first address 210 and the second address 220 as being at the location 1 GB. The device 130 may not be able to access the first application 140 and the second application 150 at the same time, because the device 130 would attempt to access the same address for both applications (e.g., resulting in device access error, faults, etc.). However, by using the first bus address offset 211 and the second bus address offset 221, the first application 140 and the second application 150 pass the first result 215 (e.g., location 4 GB in first memory 145) and the second result 225 (e.g., location 7 GB in second memory 155) to the device 130. In this way, the device 130 is able to access the first application 140 and the second application 150 at the same time, because it accesses the first result 215 and the second result 225, which are different locations from the device's 130 perspective (e.g., no device access error).

In an example, the supervisor 170 determines that the first result 215 belongs to first memory 145. Responsive to determining that the first result 215 belongs to first memory 145 (e.g., via a file descriptor), the supervisor 170 wakes up the first application 140 (e.g., delivering a wakeup or interrupt to the source). For example, the first application 140 remains asleep (e.g., idling, on standby, etc.) until the supervisor 170 determines that the first result 215 belongs to first memory 145, at which point the supervisor 170 wakes the first application 140. Likewise, in an example, the supervisor 170 determines that the second result 225 belongs to second memory 155. Responsive to determining that the second result 225 belongs to second memory 155, the supervisor 170 wakes up the second application 150. For example, the second application 150 remains asleep (e.g., idling, on standby, etc.) until the supervisor 170 determines that the second result 225 belongs to second memory 155, at which point the supervisor 170 wakes the second application 150.

Continuing on to FIG. 4B, the device 130 sends a first access request (block 430). In an example, the first access request is an access request to the first result 215 (e.g., location 4 GB in first memory 145). This first access request is received by the first application 140 (block 432). For example, the device 130 attempts to access the first application 140. Responsive to receiving the first access request, the IOMMU 160 translates the first result 215 into the first address 210 (block 434). For example, location 4 GB in first memory 145 is translated into location 1 GB in the first memory 145, which is location 1 GB in the physical memory 110. Accordingly, this translation may be executed without supervisor 170 intervention. The device 130 may then use the first physical address to access the first memory 145 (block 436). For example, physical location 1 GB in physical memory 110 may be used to access first address 210 at location 1 GB in first memory 145.

Likewise, the device 130 sends a second access request (block 438). In an example, the second access request is an access request to the second result 225 (e.g., location 7 GB in second memory 155). This second access request is received by the second application 150 (block 440). For example, the device 130 attempts to access the second application 150. Responsive to receiving the second access request, the IOMMU 160 translates the second result 225 into the second address 220 (block 442). For example, location 7 GB in second memory 155 is translated into location 1 GB in the second memory 155, which is location 3 GB in the physical memory 110. Accordingly, this translation may be executed without supervisor 170 intervention. The device 130 may then use the second physical address to access the second memory 155 (block 444). For example, physical location 3 GB in physical memory 110 may be used to access second address 220 at location 1 GB in second memory 155.

It should be noted that translation of the first result 215 into the first address 210 (block 434) and translation of the second result 225 into the second address 220 (block 442) are illustrated as being performed by the IOMMU 160. However, translation may be performed by other components (e.g., supervisor 170, first application 140, second application 150, etc.) and/or external devices (e.g., an external hardware device). In an example, the IOMMU 160 is configured, by supervisor 170, to perform translation of the first result 215 and the second result 225. For example, the supervisor 170 instructs the IOMMU 160 to translate, such that the supervisor 170 is performing translation through the IOMMU 160. In a different example, the IOMMU 160 is pre-configured (e.g., configured as-is) to perform translation of the first result 215 and the second result 225. For example, the IOMMU 160 is performing translation, without any supervisor 170 instruction.

In an example, the device 130 accesses the first application 140 through the first memory 145, and the second application 150 through the second memory 155, at the same time in parallel (e.g., simultaneously). In an example, the first application 140 has a first request buffer configured in device 130. For example, the first request buffer may be a first ring (e.g., receiving ring, transmission ring, etc.), such that the device 130 has a first ring associated with first application 140. Likewise, in an example, the second application 150 has a second request buffer configured in device 130. For example, the second request buffer may be a second ring (e.g., receiving ring, transmission ring, etc.), such that the device 130 has a second ring associated with second application 150.

In an example, the first bus address offset 211 includes a first mask, associated with higher bits of the first address 210, which are not used by the first application 140. Likewise, the second bus address offset 221 includes a second mask, associated with higher bits of the second address 220, which are not used by the second application 150. For example, each of the first address 210 and the second address 220 are represented by 32-bit addresses (e.g., bits 1-32). The numerical representation for each of these physical addresses has additional bits that are not used to represent the physical addresses (e.g., bits 33-40). These additional eight bits may serve as application identifiers, allowing for a plurality of different applications to be readily identified. For example, the additional bits can be used to designate which application is associated with each physical address. Likewise, for example, the additional bits can be used to designate bus address offsets for particular applications (e.g., designating first bus address offset 211 from second bus address offset 221). In an example, a logical OR operation is used to identify each of the first application 140 and the second application 150, by using the first mask and the second mask (e.g., the first result 215 and the second result 225 are determined, using the first mask and the second mask respectively). In a different example, the first mask and the second mask are included and identified through arithmetic functions (e.g., addition).

In an example, method 400 may further include the supervisor 170 receiving an additional assignment request (e.g., a third assignment request). The additional assignment request is a request to assign the device to a third application. In an example, the third application is associated with a third memory, the third memory being a portion of physical memory 110 different from first memory 145 and second memory 155. For example, the third memory may be a portion of additional memory 205 (e.g., physical locations 4 GB to 6 GB in physical memory 110). The third memory has a third address (e.g., location 1 GB in third memory, corresponding to location 5 GB in physical memory 110).

In the example above, method 400 further includes selecting, by the supervisor 170, a third bus address offset. The third bus address offset is different from the first bus address offset 211 and the second bus address offset 221. For example, if the first bus address offset 211 is a 3 GB offset, and the second bus address offset 221 is a 6 GB offset, the third bus address offset may be a 9 GB offset.

The supervisor 170 sends, to the third application, the third bus address offset (e.g., the 9 GB offset). The supervisor 170 updates the IOMMU 160. For example, the supervisor 170 updates a mapping to the third address (e.g., location 1 GB in third memory) to include the third bus address offset (e.g., the 9 GB offset). The supervisor 170 determines, using the third bus address offset and the third address, a third result. For example, adding the third bus address offset (e.g., 9 GB offset) to the third address (e.g., at location 1 GB in third memory) yields third result at location 10 GB in third memory. The third application sends the third result (e.g., location 10 GB in third memory) to device 130.

The method 400 further includes the device 130 sending a third access request. In an example, the third access request is an access request to the third result (e.g., location 10 GB in third memory). This third access request is received by the third application. For example, the device 130 attempts to access the third application. Responsive to receiving the third access request, the IOMMU 160 translates the third result (e.g., location 10 GB in third memory) into the third address (e.g., location 1 GB in the third memory 145, which is location 5 GB in the physical memory 110). Accordingly, this translation may be executed without supervisor 170 intervention. The device 130 may then use the third physical address (e.g., physical location 1 GB in the physical memory 110) to access the third memory (e.g., third address at location 1 GB in third memory).

Figure 5:
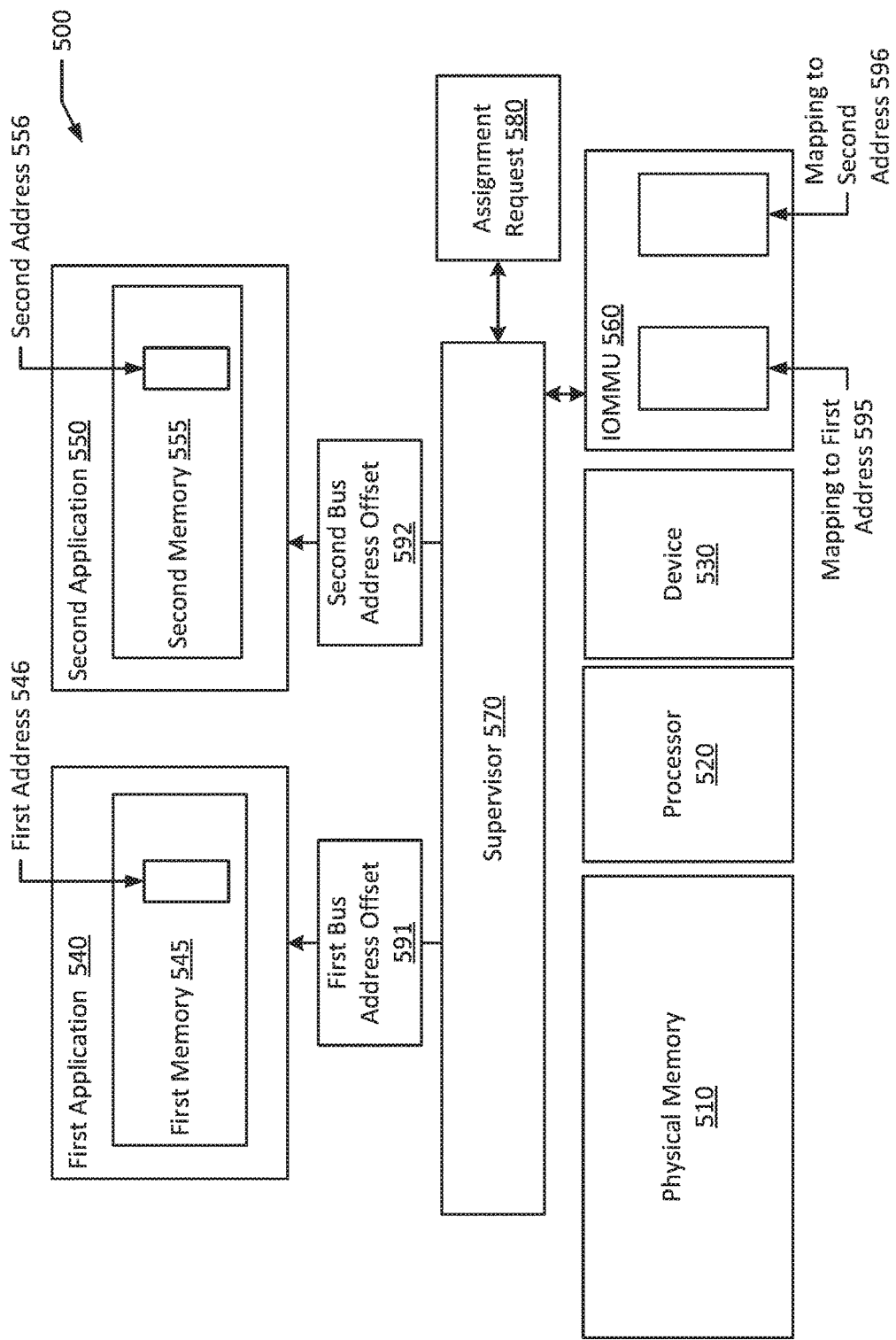
FIG. 5 is a block diagram of an example computer system according to an example of the present disclosure.

FIG. 5 is a block diagram of an example computer system 500 according to an example of the present disclosure. The computer system 500 may include physical memory 510 and processor 520, in communication with physical memory 510. Computer system 500 may also include device 530, first application 540, and second application 550. First application 540 is associated with first memory 545. In an example, first memory 545 is a portion of physical memory 510. First memory 545 has a first address 546. Likewise, second application 550 is associated with second memory 555. In an example, second memory 555 is a portion of physical memory 510 different from first memory 545. Second memory 55 has a second address 556. The computer system 500 may also include an input-output memory management unit (IOMMU) 560 and a supervisor 570. In an example, the supervisor 570 is a kernel.

The supervisor 570 may receive an assignment request 580. The assignment request 580 is a request to assign the device 530 to a plurality of applications including at least the first application 540 and the second application 550. The supervisor 570 may select a first bus address offset 591 and a second bus address offset 592. The second bus address offset 592 is different from the first bus address offset 591. In an example, the second bus address offset 592 is a numerical multiple of the first bus address offset 591.

The supervisor 570 may send, to the first application 540, the first bus address offset 591. Likewise, the supervisor 570 may send, to the second application 550, the second bus address offset 592. The supervisor 570 may update the IOMMU 560, including updating a mapping 595 to the first address 546 to include the first bus address offset 591 and updating a mapping 596 to the second address 556 to include the second bus address offset 592. The supervisor 570 may accordingly assign the device 530 to the first application 540 and the second application 550.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

It should be understood that various changes and modifications to the examples described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method of device assignment, the method comprising:
   receiving, by a supervisor executing on one or more processors, an assignment request, wherein the assignment request is a request to assign a hardware device to a plurality of applications including at least:
   a first application associated with a first memory, the first memory being a portion of a physical memory and having a first address, and
   a second application associated with a second memory, the second memory being a portion of the physical memory different from the first memory and having a second address;
   selecting, by the supervisor, a first bus address offset and a second bus address offset, wherein the second bus address offset is different from the first bus address offset;
   sending, by the supervisor to the first application, the first bus address offset;
   sending, by the supervisor to the second application, the second bus address offset;
   updating, by the supervisor, an input-output memory management unit, including:
   updating a mapping to the first address to include the first bus address offset, and
   updating a mapping to the second address to include the second bus address offset; and
   assigning the hardware device to the first application and the second application,
   wherein the hardware device is separate and distinct from the one or more processors.

2. The method of claim 1, further comprising:
   determining, using the first bus address offset and the first address, a first result;
   sending, to the hardware device by the first application, the first result;
   determining, using the second bus address offset and the second address, a second result; and
   sending, to the hardware device by the second application, the second result.

3. The method of claim 2, further comprising:
   receiving, from the hardware device, a first access request, wherein the first access request is an access request to the first result; and
   responsive to receiving the first access request, translating, by the input-output memory management unit, the first result into the first address, such that the hardware device accesses the first memory at the first address.

4. The method of claim 3, further comprising:
   receiving, from the hardware device, a second access request, wherein the second access request is an access request to the second result;
   responsive to receiving the second access request, translating, by the input-output memory management unit, the second result into the second address, such that the hardware device accesses the second memory at the second address;
   wherein the hardware device accesses the first application through the first memory, and the second application through the second memory; and
   wherein the first application has a first request buffer configured in the hardware device and the second application has a second request buffer configured in the hardware device.

5. The method of claim 4, wherein the hardware device accesses the first application through the first memory, and the second application through the second memory, at the same time in parallel.

6. The method of claim 2, further comprising:
   receiving, by the supervisor, an additional assignment request, wherein the additional assignment request is the request to assign the hardware device to a third application associated with a third memory, the third memory being a portion of the physical memory different from the first memory and the second memory and having a third address;
   selecting, by the supervisor, a third bus address offset, wherein the third bus address offset is different from the first bus address offset and the second bus address offset;
   sending, by the supervisor to the third application, the third bus address offset;
   updating, by the supervisor, the input-output memory management unit by updating a mapping to the third address to include the third bus address offset;
   determining, using the third bus address offset and the third address, a third result;
   sending, to the hardware device by the third application, the third result;
   receiving, from the hardware device, a third access request, wherein the third access request is an access request to the third result; and
   responsive to receiving the third access request, translating, by the input-output memory management unit, the third result into the third address, such that the hardware device accesses the third memory at the third address.

7. The method of claim 2, wherein the first application has a first request buffer configured in the hardware device and the second application has a second request buffer configured in the hardware device.

8. The method of claim 2, further comprising:
   determining, by the supervisor, that the first result belongs to the first memory; and
   responsive to determining that the first result belongs to the first memory, waking up the first application.

9. The method of claim 1, wherein the supervisor is included in an operating system.

10. The method of claim 1, wherein, by updating the mapping to the first address to include the first bus address offset and by updating the mapping to the second address to include the second bus address offset, the supervisor configures the input-output memory management unit to limit the hardware device to accessing the first memory and the second memory, such that additional memory is protected from the hardware device.

11. The method of claim 1, wherein the assignment request is sent, to the supervisor, from an administrator.

12. The method of claim 1, wherein each of the first application and the second application are in a security group.

13. The method of claim 1, wherein the first bus address offset and the second bus address offset are numerical multiples of one another.

14. The method of claim 13, wherein the first bus address offset is a 3 GB offset and the second bus address offset is a 6 GB offset.

15. A system of device assignment, the system comprising:
a physical memory;
one or more processors, in communication with the physical memory;
a hardware device;
a first application associated with a first memory, the first memory being a portion of the physical memory and having a first address, executing on the one or more processors;
a second application associated with a second memory, the second memory being a portion of the physical memory different from the first memory and having a second address, executing on the one or more processors;
an input-output memory management unit; and
a supervisor, executing on the one or more processors, to:
receive an assignment request, wherein the assignment request is a request to assign the hardware device to a plurality of applications including at least the first application and the second application;
select a first bus address offset and a second bus address offset, wherein the second bus address offset is different from the first bus address offset;
send, to the first application, the first bus address offset;
send, to the second application, the second bus address offset; and
update the input-output memory management unit, including:
updating a mapping to the first address to include the first bus address offset,
updating a mapping to the second address to include the second bus address offset; and
assign the hardware device to the first application and the second application,
wherein the hardware device is separate and distinct from the one or more processors.

16. The system of claim 15, further comprising:
wherein the first application determines, using the first bus address offset and the first address, a first result;
wherein the first application sends, to the hardware device, the first result;
wherein the second application determines, using the second bus address offset and the second address, a second result;
wherein the second application sends, to the hardware device, the second result;
wherein the first application receives, from the hardware device, a first access request, the first access request being an access request to the first result;
wherein responsive to receiving the first access request, the input-output memory management unit translates the first result into the first address, such that the hardware device accesses the first memory at the first address; and
wherein the hardware device accesses the first application through the first memory, and the second application through the second memory, at the same time in parallel.

17. The system of claim 15, wherein, by updating the mapping to the first address to include the first bus address offset and by updating the mapping to the second address to include the second bus address offset, the supervisor configures the input-output memory management to limit the hardware device to accessing the first memory and the second memory, such that additional memory is protected from the hardware device.

18. The system of claim 15, wherein the assignment request is sent, to the supervisor, from an administrator.

19. The system of claim 15, wherein the first bus address offset and the second bus address offset are numerical multiples of one another.

20. A computer-readable non-transitory storage medium comprising executable instructions that, when executed on one or more processors, cause a supervisor to:
receive an assignment request, wherein the assignment request is a request to assign a hardware device to a plurality of applications including at least:
a first application associated with a first memory, the first memory being a portion of a physical memory and having a first address, and
a second application associated with a second memory, the second memory being a portion of the physical memory different from the first memory and having a second address;
select a first bus address offset and a second bus address offset, wherein the second bus address offset is different from the first bus address offset;
send, to the first application, the first bus address offset;
send, to the second application, the second bus address offset;
update an input-output memory management unit, including:
updating a mapping to the first address to include the first bus address offset, and
updating a mapping to the second address to include the second bus address offset; and
assign the hardware device to the first application and the second application,
wherein the hardware device is separate and distinct from the one or more processors.

* * * * *